May 12, 1964     M. A. JACKSON     3,132,721

METAL BENDING COMPRESSION SHOCK ABSORBER

Filed July 5, 1962     2 Sheets-Sheet 1

INVENTOR
Martin A. Jackson

BY
Stevens, Davis, Miller & Mosher
ATTORNEYS

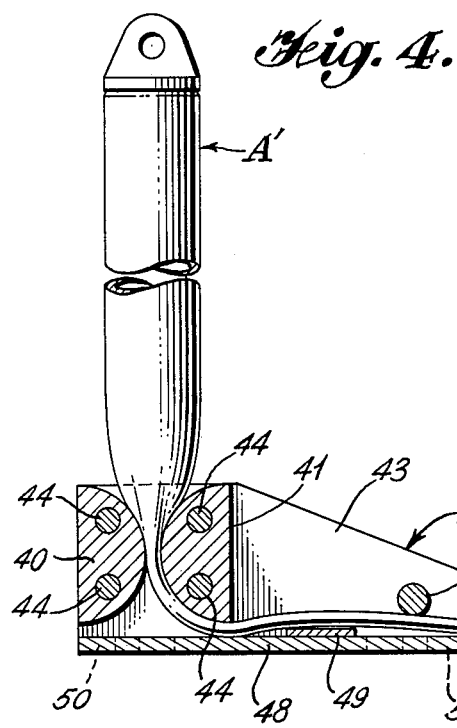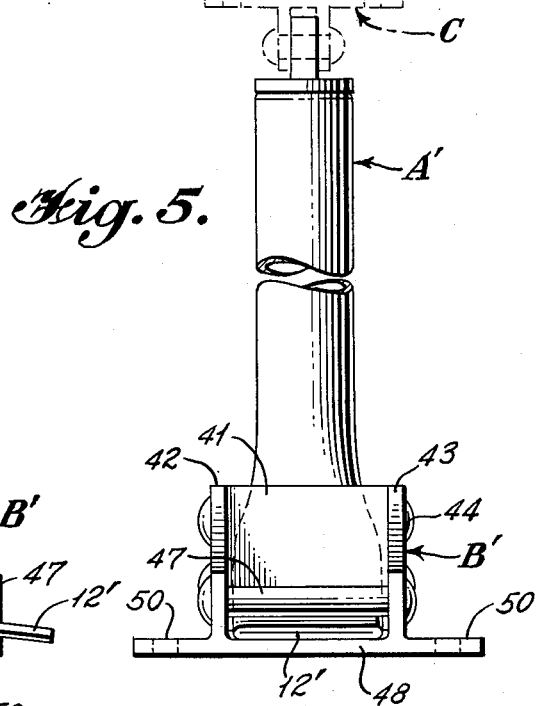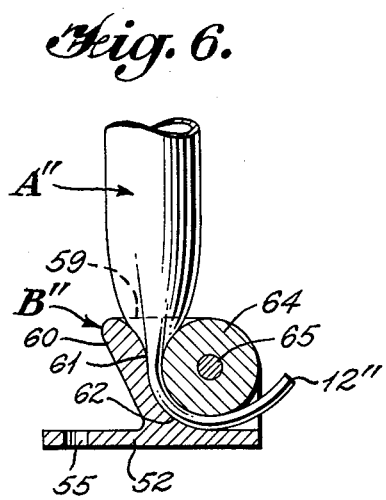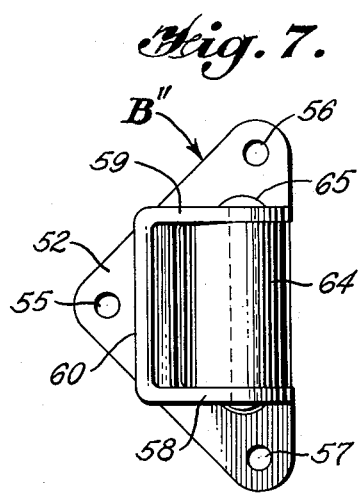

United States Patent Office 3,132,721
Patented May 12, 1964

3,132,721
METAL BENDING COMPRESSION
SHOCK ABSORBER
Martin A. Jackson, Bradshaw, Md., assignor to Van Zelm
Associates Inc., Baltimore, Md., a corporation of
Maryland
Filed July 5, 1962, Ser. No. 207,612
11 Claims. (Cl. 188—1)

This invention relates to a metal bending compression type shock absorber and support device particularly adapted for use in protecting relatively movable objects against impact damage carried by air, land or other type vehicles. While it is particularly adapted for use in vehicles, such as for struts for collapsible shock absorbing seats for example, it will be apparent that it is also adapted for use in protecting objects from impact damage that are intended for dropping from considerable heights with respect to static structures.

It is therefore an object of the invention to provide a compression type shock absorber that absorbs energy of impact between two relatively movable structures by deforming and bending metal tubing having any suitable cross-section and thickness.

It is a further object to provide a compression type shock absorber interposed between two relatively movable units subject to impact forces, the device absorbing impact energy by squashing and flattening suitable metal tubing of a given cross-section to a different cross-section by employing the energy of impact to thrust and deform the tubing between suitable fixed or rotatable die members.

Another object is to provide a compression type shock absorber that provides a support function between two structures subject to but prior to the occurrence of impact forces therebetween and capable of absorbing such impact forces by squashing and flattening metal tubing that is preferably initially of round cross-section between rollers or fixed dies.

Another object is the provision of a metal deforming and metal bending, compression type shock absorber that squashes and flattens metal tubing between deforming members on occurrence of impact forces between two relatively movable structural units and, in addition, utilizes the bent and flattened portion of the tubing to further absorb a portion of the energy of impact by mechanical friction and further working of the metal in thrusting against the undeformed portion of the tubing.

A still further object is to provide an effective but simple, inexpensive and expendable metal bending compression type shock absorber adapted for use between two relatively movable members subject to impact forces and which, prior to the occurrence of impact, functions as a support structure.

The foregoing and other objects of the invention will be understood from the following description which, taken in connection with the accompanying drawings, discloses several embodiments thereof.

Referring to the drawings:

FIGURE 4 is an elevational view, partly in section, of another embodiment of the device.

FIGURE 5 is a side view of the device viewed from the right in FIGURE 4.

FIGURE 6 is a side view, partly in section, of the lower portion of a further embodiment of the device.

FIGURE 7 is a plan view of the foot die member of the construction shown in FIGURE 6 with the tubular member omitted for purposes of clarity.

Figure 1:
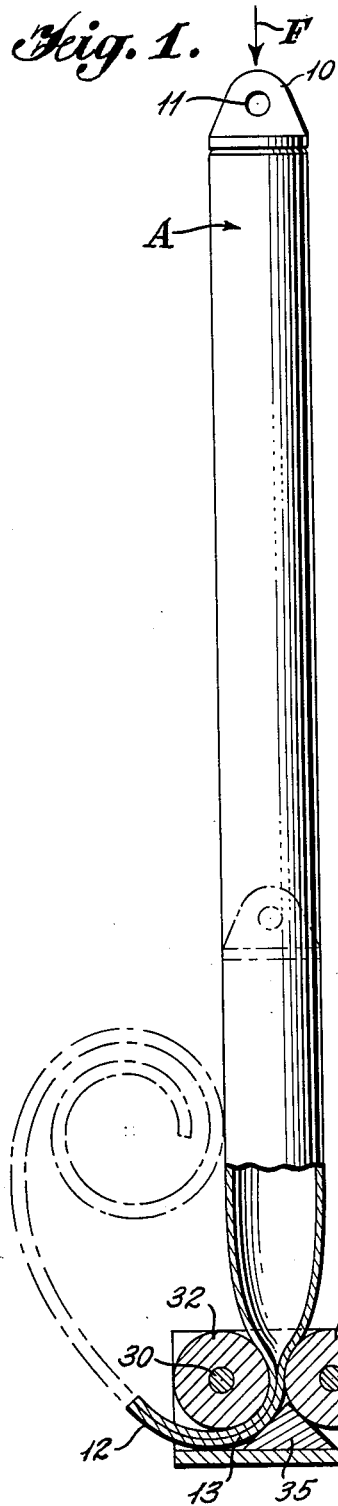
FIGURE 1 is an elevational view, partly in section, of one form of the invention.
Figure 2:
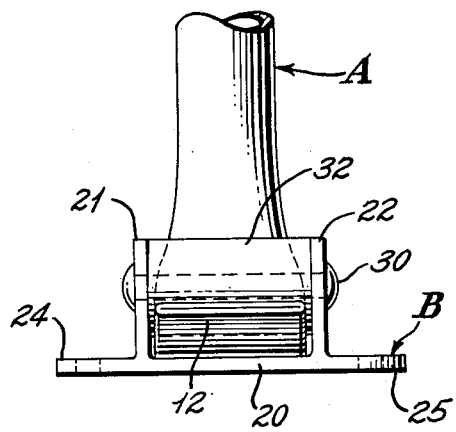
FIGURE 2 is a side elevational view of the lower portion of the device shown in FIGURE 1 and viewed from the left thereof.
Figure 3:
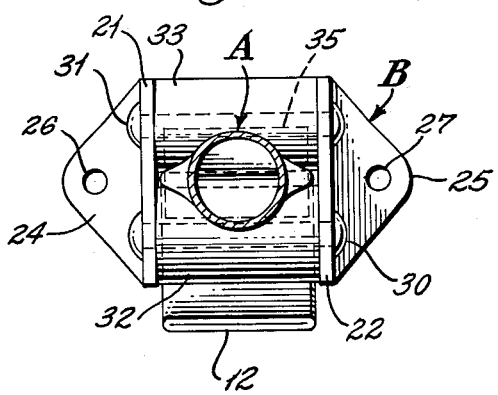
FIGURE 3 is a plan view of the portion shown in FIGURE 2.

Noting FIGURES 1–3 the metal bending compression type shock absorber comprises a first member A of metal tubing preferably of round section, though tubing of any desired sectional shape may be used. The upper end of tubing A has suitably attached thereto, as by welding, or by loose swedging to permit swivelling a mounting member 10 provided with aperture means 11 or the like for securing the upper end of the tubing, by means of a fitting such as shown at C in FIGURE 5, to one of a pair of relatively movable structures (not shown) with which the device is to be used. The lower end 12 of the tubing is initially deformed, as by being squashed or flattened and arcuately bent at 13 for a reason to be explained.

The die foot member B which may be a forging, or otherwise suitably formed, comprises a flat plate-like base portion 20 having a flat upper surface and a pair of parallel upstanding or vertically extending walls 21, 22 spaced apart a distance slightly greater than the width of the initially flattened end 12 of the tubing A. The flat base portion 20 is suitably extended beyond the vertical walls 20, 21 thereof to provide mounting ears 24 and 25 apertured at 26 and 27 for receiving bolts, rivets or the like for attaching the device to the other structure (not shown) with which the device is to be used.

Mounted in upstanding walls 21, 22 and in a plane substantially parallel to base portion 20 are two parallelly disposed axle members 30 and 31 each of which carries a die roller 32 and 33, respectively, which are spaced from each other, as shown in FIGURE 1, a distance slightly greater than the thickness of the flattened end portion 12 of tubing A, that is, a thickness which precludes cracking of the flattened portion of the tube along the edges. The length of die rollers 32, 33 conforms generally to the spacing between the vertically extending walls 21, 22. While members 32 and 33 have been described as rollers it is not essential that they be capable of rotation on their respective axle members 30 and 31.

Extending integrally and upwardly from the flat base portion 20 of member B and between the pair of vertical walls 21, 22 thereof is an inverted V-block type camming member 35 of a length corresponding substantially to the width of the flattened end 12 of tubing A and disposed parallel to axles 30, 31. Camming member 20, as indicated in FIGURE 1, is positioned close to die roller 33 to provide passage clearance for the end 12 of the tubing with respect to die roller 32.

Before use, the foot die member B is initially placed in engagement with the lower end 12 of tubing A as shown in FIGURE 1. To mount the shock absorber, the upper end of tubing A is rigidly attached at 11, by means of an adapter C (FIGURE 5), to one of the relatively movable structures (not shown) subject to impact forces, while the die foot member B is rigidly secured at 26, 27 to the other relatively movable structure (not shown). It is to be understood, of course, that in mounting the device, its major axis, which is axially of tubing A, will be positioned so as to be parallel to, or in the direction of, the expected impact forces, as indicated by the arrow F in FIGURE 1. It is to be noted that when positioned vertically, as in FIGURE 1, the device may also function as a supporting structure prior to the occurrence of impact forces of such value as to cause it to be deformed, as intended, in performing its shock absorbing function.

When the impact force F is of such value as to cause the device to function, the lower end of tubing A is forced downwardly between rollers 32, 33 which squashes or flattens it adjacent its initially flattened end portion 12. Camming member 35 and the flat top surface of the base member then sequentially bend or deflect the flattened end portion 12 of the tube, whereby it arcuately curls up alongside the device in the manner indicated in FIGURE 1, to abut the side of the tubing. This lateral pressure of the flattened end portion 12 against the side of the round tubing A tends to increase the radius of curvature of the curl and tends to straighten the metal. Since the force necessary to effect the above originates with the force F of impact, it is apparent that such force is absorbed or dissipated in the work of deforming of the tubing A by the die foot structure B and by the metal working forces developed in and acting on the tubing, as above indicated.

By reason of the deformed and curled condition of the lower end 12 of tubing A after absorbing impact forces once applied, it is obvious, as indicated in FIGURE 1, that the device is substantially irreversible in its functioning. After once being largely deformed by an excessive impact force, the device as a whole is incapable of re-use and therefore may be considered expendable. However, in the event of this happening, the die foot member B itself would, in all probability, not be damaged and therefore would be capable of being salvaged for re-use.

In FIGURES 4 and 5 there is disclosed a modification of the shock absorber where the die foot member B' employs two rigidly fixed semicylindrical tube flattening die members 40 and 41 instead of roller means as in the case of the first described embodiment. The fixed die members 40 and 41 are rigidly secured between the vertically extending and parallelly spaced side walls 42, 43 at one end thereof, by means of rivets 44 or the like, with their facing semicylindrical faces spaced apart and above the flat upper surface of the base 48 of the die foot member B' a distance corresponding to the thickness of the flattened end 12' of tubular member B'.

Die foot member B' as shown in the embodiment of FIGURE 4 is of greater length than that of the FIGURE 1 embodiment. Mounted between vertical walls 43 and 42 and positioned adjacent the end thereof, opposite the end on which the fixed semicylindrical die members 40 and 41 are mounted, is a camming pin, rivet, or the like, 47 disposed in a plane parallel to the die foot base 48 and spaced above it a sufficient distance to allow the flattened end portion 12' of the tubular member A' to pass freely therethrough, as shown in FIGURE 4. A camming lug similar to lug 35 of FIGURE 1 may be mounted, if desired, on base 48 adjacent the arcuate surface of semicylindrical die member 40 to aid in deflecting or guiding the end 12' of the flattened tubular member toward camming rivet 47. Intermediate semicylindrical die member 41 and pin 47 is positioned a deforming or bending lug 49 rigidly secured, as by welding, onto the upper flat surface of base 48. Suitably apertured mounting ears 50 are provided on and extend outwardly on die base 48 for fixedly securing the die foot member onto one of the relatively movable members subject to impact shock forces.

Before the device of this embodiment is used as a shock absorber, the preflattened end 12' of tubing A', as in the preceding embodiment, is threaded between the arcuate faces of semicylindrical members 40, 41 then towards and over the deforming lug 49 and thence between pin 47 and the upper surface of the base member. As is clear from the showing in FIGURE 4, the device, like that of FIGURE 1, possesses a support function prior to functioning as a shock absorber and absorbing excessive impact forces. When acted upon by such impact shock forces sufficient to effect its operation for absorption thereof, the tubular member A' is forced downwardly between the cylindrical members 40 and 41 which deformingly squash or flatten it. As the flattened end 12' then moves toward and under pin 47, it is first deflected laterally by the upper surface of base 48 and then somewhat upwardly by camming lug 49 and then downwardly deflected by pin means 47. The deforming or bending function of members 49 and 47 of this embodiment is comparable in effect to the engagement of the flattened end 12 of the tubular member A with its undeformed portion in FIGURE 1 in absorbing additional energy of the impact forces after the end portion of the tubular member A' has been flattened by die members 40, 41. That is, the straightening effect absorbs energy.

FIGURES 6 and 7 show a further modification of the die foot member wherein the foot member B" comprises a triangular base 52 suitably apertured at 55, 56 and 57 in its three corner portions, for mounting purposes. Carried by the triangular base 52 are two parallelly spaced upstanding or vertical walls 58 and 59. Joining these walls at one end and transversely thereof is an inclined wall 60 sloping downwardly and inwardly towards the central portion of base 52, as shown in FIGURE 6. Spaced from wall 60 and at the opposite end portion of the vertical walls 58, 59 is mounted a cylindrical die roller 64, of a length corresponding substantially to the spacing of walls 58, 59, on an axle member 65. The roller 64, which may or may not rotate, is mounted in the upper portion of these walls with its axis parallel to transverse wall 60. As shown in FIGURE 6 the ends of walls 58, 59 adjacent the roller are preferably radiused or rounded to conform to the periphery of the roller so as to be coincident therewith.

The upper half portion of the wall 60 facing roller 64 is provided with a male radiused surface 61 corresponding to the curvature of the roller, while the lower half portion has a female radiused surface 62 likewise corresponding to the roller curvature and which merges smoothly and flush with the upper surface of the base 52. The spacing of roller 64 from these arcuate surfaces 61, 62 and the upper surface of base 52 forms a passage which corresponds to, or is slightly greater than, the thickness of the flattened portion 12" of the tubular member A". It is thus apparent that wall surface 61 constitutes a die element which coacts with the die roller 64 to squash or flatten the tubing at is is forced through the die foot member and the surface 62 functions as a camming member to afterward bend or deflect the free flattened end 12" of the tube as it is pushed through the die foot on the occurrence of sufficient impact forces acting on the relatively movable elements (not shown) between which the shock absorber would be mounted as to cause them to move towards each other.

As in the case of the embodiment shown in FIGURE 1, the flattened end 12" of the tubular member will correspondingly curl around, after passing from the die foot member B", to frictionally bear against the side of the undeformed portion of the tubular member to thereby provide additional frictional resistance to the compressive movement of the members A" and B", if the forces acting thereon are of sufficient magnitude. As with previously described embodiments, the mounting of the device is the same with respect to the direction of the impact forces acting thereon.

It will be obvious to those skilled in the art that various changes may be made in the invention without departing from the spirit thereof. The invention is therefore not limited to that which is shown in the drawings and described in the specification, but only as indicated by the appended claims.

What is claimed is:

1. A compression type shock absorber comprising a metal tubular means adapted for attachment at one end thereof to one of a pair of structures subject to impact forces, means engaging said tubular means at its opposite end and adapted for connection to the other of said structures, said last-mentioned means including die means in squashing engagement with said opposite end of the outside of said tubular means and operative to progressively squash said opposite end of said tubular means inwardly as said structures approach each other under the effect of impact forces to thereby absorb the energy of said impact forces acting on said structures by the absorption of energy in the deformation of said metal tubular means.

2. A compression type shock absorber as defined in claim 1, wherein said last-mentioned means includes means to deflect the squashed end portion of said tubular means in a direction out of alignment with said tubular means.

3. A compression type shock absorber as defined in claim 2, wherein said means to deflect the squashed portion of said tubular means comprises a camming means positioned adjacent said die means.

4. A compression type shock absorber comprising a metal tubular member adapted for attachment at one end thereof to one of a pair of structures subject to impact forces, means engaging said tubular member at its opposite end and adapted for connection to the other of said structures, said last-mentioned means including die means for squashing and flattening engagement with said opposite end of said tubular member and operative to progressively squash and flatten said opposite end of said tubular member as said structures approach each other under the effect of impact forces, to absorb the energy of impact by the deformation of said tubular member, said die means comprising a plurality of arcuate-surfaced means.

5. A compression type shock absorber as defined in claim 4, wherein said means comprises a die foot member having a flat mounting base portion and a pair of parallelly spaced upstanding walls projecting therefrom, said plurality of arcuate-surfaced die means including at least one roller carried by said pair of upstanding walls.

6. A compression type shock absorber as defined in claim 4, wherein said means comprises a die foot member having a flat mounting base portion and a pair of parallelly spaced upstanding walls projecting therefrom, and said plurality of arcuate-surfaced die means comprises at least one stationarily fixed arcuate-surfaced member carried by said pair of upstanding walls.

7. A compression type shock absorber as defined in claim 4, wherein said means comprises a die foot member having a flat mounting base portion and a pair of parallelly spaced upstanding walls projecting therefrom, and said plurality of arcuate-surfaced die means comprises stationary semicylindrical members, the cylindrical faces of which are in spaced facing relation to each other, said semicylindrical members being fixedly mounted on said parallelly spaced upstanding walls.

8. A compression type shock absorber as defined in claim 4, wherein said means comprises a die foot member having a mounting base portion and a pair of parallelly spaced upstanding walls projecting therefrom and said plurality of arcuate-surfaced die means comprises a pair of parallelly spaced rollers having cylindrical peripheries and mounted in said pair of parallelly spaced upstanding walls.

9. A compression type shock absorber as defined in claim 4, wherein said means comprises a die foot member having a mounting base portion and a plurality of upstanding walls projecting therefrom, one of said walls having a roller having a cylindrical periphery carried by a pair of said upstanding walls, said upstanding walls including a further wall having a projecting arcuate die surface thereon in facing, spaced, parallel relation to the cylindrical surface of said roller.

10. A compression type shock absorber as defined in claim 9, wherein said further upstanding wall includes an arcuate deflecting surface concentric with the axis of said roller and spaced from the said cylindrical surface of said roller, said last-mentioned arcuate deflecting surface merging at one of its ends into said first arcuate surface and at its other end merging into the upper surface of said mounting base portion.

11. A compression type shock absorber as defined in claim 4, wherein said means comprises a die foot member having a flat mounting base portion having a flat upper surface, a pair of parallelly spaced upstanding walls projecting therefrom, a pair of spaced semicylindrical die members fixedly mounted at one end on said pair of upstanding walls and spaced above said flat mounting base portion a distance sufficient for the passage of the flattened end of said tubular member, a deflecting pin member mounted in the opposite end of said parallel walls and spaced above in parallel relation to the top of said flat base portion a distance sufficient for the passage of the flattened end of the tubular member, a camming lug means mounted on the top of said flat base portion intermediate said semicylindrical die members and said deflecting pin member whereby as the flattened end of said tubular member moves from said semicylindrical die members it is sequentially deflected out of alignment with said tubular member by the said flat upper surface of said flat mounting base portion and upwardly by said camming lug means and then downwardly by said deflecting pin member.

References Cited in the file of this patent
UNITED STATES PATENTS

| | | |
|---|---|---|
| 2,954,966 | Cushman | Oct. 4, 1960 |
| 3,026,972 | Hendry et al. | Mar. 27, 1962 |
| 3,035,794 | Murray | May 22, 1962 |
| 3,057,440 | Broudo | Oct. 9, 1962 |

FOREIGN PATENTS

| | | |
|---|---|---|
| 472,071 | Canada | Mar. 13, 1951 |